(12) United States Patent
Kennedy (10) Patent No.: US 8,935,349 B2
(45) Date of Patent: Jan. 13, 2015

(54) ESTABLISHMENT OF A CONFERENCE (71) Applicant: Comcast Cable Communications, LLC, Philadelphia, PA (US)

(72) Inventor: Christopher J. Kennedy, Highlands Ranch, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 13/924,083

(22) Filed: Jun. 21, 2013

(65) Prior Publication Data

US 2013/0297713 A1 Nov. 7, 2013

Related U.S. Application Data (63) Continuation of application No. 12/849,073, filed on Aug. 3, 2010, now Pat. No. 8,489,692.

(51) Int. Cl.
*G06F 15/16* (2006.01)
*H04L 12/18* (2006.01)
*H04L 29/08* (2006.01)
*H04L 12/58* (2006.01)

(52) U.S. Cl.
CPC .............. *H04L 12/18* (2013.01); *H04L 67/24* (2013.01); *H04L 51/04* (2013.01); *H04L 12/1818* (2013.01)
USPC ........... 709/206; 709/203; 709/217; 709/223; 725/39; 725/42; 725/47

(58) Field of Classification Search
CPC .......... H04L 12/18; H04L 51/04; H04L 67/24
USPC ......... 709/203, 204, 206, 217, 219, 223, 224; 725/39, 40, 42, 44, 47, 51
See application file for complete search history.

(56) References Cited

U.S. PATENT DOCUMENTS

| | | | |
|---|---|---|---|
| 5,541,738 A * | 7/1996 | Mankovitz | 386/245 |
| 5,630,119 A * | 5/1997 | Aristides et al. | 1/1 |
| 6,577,622 B1 | 6/2003 | Schuster et al. | |
| 6,754,904 B1 * | 6/2004 | Cooper et al. | 725/32 |
| 6,772,436 B1 * | 8/2004 | Doganata et al. | 725/106 |
| 6,883,176 B1 * | 4/2005 | Grooters | 725/39 |
| 6,898,762 B2 * | 5/2005 | Ellis et al. | 715/716 |
| 7,187,847 B2 * | 3/2007 | Young et al. | 386/291 |
| 7,197,759 B2 * | 3/2007 | Barrett et al. | 725/43 |
| 7,209,947 B1 * | 4/2007 | Lee et al. | 709/204 |
| 7,319,983 B2 * | 1/2008 | Colabella et al. | 705/35 |
| 7,398,541 B2 * | 7/2008 | Bennington et al. | 725/40 |
| 7,436,785 B1 * | 10/2008 | McMullen et al. | 370/261 |

(Continued)

*Primary Examiner* — Lashonda Jacobs
(74) *Attorney, Agent, or Firm* — Baner & Witcoff, Ltd.

(57) ABSTRACT

An apparatus, method, computer readable medium, and system are provided for associating content with a conference. A viewer of content may elect to partake in a conference and may select one or more options associated with the conference. The viewer may be authenticated and billed based on the viewer's participation in the conference. The viewer may be assigned to a conference group based on a location of the viewer and/or the viewer's selections of conference options. A lookup may be performed to determine conference parameters, comprising one or more of a terminal identifier associated with the viewer, a conference code identifier and a participant code. A conference setup message may be transmitted to one or more of a switch and a customer premise equipment device (CPE) based on the conference parameters.

20 Claims, 6 Drawing Sheets

(56) References Cited

U.S. PATENT DOCUMENTS

| | | |
|---|---|---|
| 7,573,498 B1 * | 8/2009 | Dhanoa et al. ............. 348/14.04 |
| 7,630,328 B2 | 12/2009 | Wright et al. |
| 7,665,109 B2 * | 2/2010 | Matthews et al. ................ 725/51 |
| 7,716,283 B2 * | 5/2010 | Thukral ........................ 709/204 |
| 7,748,018 B2 * | 6/2010 | Young et al. .................... 725/47 |
| 7,774,343 B2 * | 8/2010 | Thiagarajan et al. ......... 707/736 |
| 8,051,450 B2 * | 11/2011 | Robarts et al. .................. 725/53 |
| 8,108,899 B2 * | 1/2012 | Shoff et al. ..................... 725/52 |
| 8,151,296 B2 * | 4/2012 | Hassell et al. .................. 725/34 |
| 8,205,232 B2 * | 6/2012 | Schein et al. ................... 725/53 |
| 8,208,001 B2 * | 6/2012 | Tucker et al. .............. 348/14.08 |
| 8,225,354 B2 * | 7/2012 | Acton et al. .................... 725/49 |
| 8,381,249 B2 * | 2/2013 | Rasanen et al. ................. 725/47 |
| 8,707,189 B2 * | 4/2014 | Liu et al. ....................... 715/758 |
| 2003/0018971 A1 * | 1/2003 | McKenna, Jr. .................. 725/40 |
| 2003/0163813 A1 * | 8/2003 | Klosterman et al. ............ 725/42 |
| 2003/0184578 A1 * | 10/2003 | Cowperthwaite ............. 345/721 |
| 2003/0193559 A1 * | 10/2003 | Fernandez et al. ......... 348/14.08 |
| 2003/0208756 A1 * | 11/2003 | Macrae et al. ................... 725/34 |
| 2004/0231003 A1 * | 11/2004 | Cooper et al. ................. 725/135 |
| 2005/0015803 A1 * | 1/2005 | Macrae et al. ................... 725/41 |
| 2005/0235320 A1 * | 10/2005 | Maze et al. ...................... 725/52 |
| 2005/0278741 A1 * | 12/2005 | Robarts et al. .................. 725/46 |
| 2006/0184624 A1 * | 8/2006 | Thukral ........................ 709/204 |
| 2007/0199018 A1 * | 8/2007 | Angiolillo et al. .............. 725/39 |
| 2007/0199019 A1 * | 8/2007 | Angiolillo et al. .............. 725/39 |
| 2008/0184308 A1 * | 7/2008 | Herrington et al. ............. 725/43 |
| 2009/0169178 A1 * | 7/2009 | Higgins et al. ................ 386/124 |
| 2009/0300680 A1 * | 12/2009 | Cook et al. ...................... 725/44 |
| 2010/0066808 A1 * | 3/2010 | Tucker et al. .............. 348/14.09 |
| 2010/0083182 A1 * | 4/2010 | Liu et al. ....................... 715/843 |
| 2010/0228547 A1 * | 9/2010 | Scott et al. .................... 704/235 |
| 2010/0263004 A1 * | 10/2010 | Barton et al. ................. 725/106 |
| 2011/0067067 A1 * | 3/2011 | Ellis ................................ 725/50 |
| 2011/0131593 A1 * | 6/2011 | Scott et al. ........................ 725/9 |
| 2012/0011205 A1 * | 1/2012 | Paulsami et al. .............. 709/206 |
| 2012/0174156 A1 * | 7/2012 | Park et al. ....................... 725/40 |
| 2012/0188330 A1 * | 7/2012 | Turner ...................... 348/14.08 |
| 2012/0291070 A1 * | 11/2012 | Feng et al. ...................... 725/40 |

* cited by examiner

ESTABLISHMENT OF A CONFERENCE

FIELD OF ART

The features described herein generally relate to providing users with access to content over a network. More specifically, aspects of the disclosure describe establishing a conference over one or more networks.

BACKGROUND

Social networking is frequently based on shared common interests. For example, people that like a particular movie may create or establish a web page dedicated to the movie. On the web page, the people may post messages with respect to the movie. For example, people may write or post messages regarding the characters, the acting, themes, plot sequence and the like.

While current social networking platforms may bring people together that share a common interest, the social networking platforms tend to be location independent. Moreover, communications via conventional social networking platforms tend to be stale in nature and are established outside of a logical context. It is difficult to locate relevant social networking groups, given the proliferation of information that is now available due to advancements in technology, including the Internet. Social networking users are continuously looking for ways to improve on how they connect to, and interact with, one another.

SUMMARY

This summary is not intended to identify critical or essential features of the disclosure provided herein, but instead merely summarizes certain features and variations thereof.

In some embodiments, a conferencing option may be associated with an electronic program guide (EPG), an interactive program guide (IPG), a television program, a movie, or any other visual programming content. The presence or availability of a conferencing option may be indicated as an icon, as an option in a menu, or the like. In response to a selection of the conferencing option, a message may be transmitted from a customer premise equipment device (CPE), to a video application server (VAS). The message transmitted to the VAS may include one or more of a CPE identification (ID), a viewer (ID), and a program identification (PID).

In some embodiments, the VAS may be configured to respond to the message received from the CPE. That response may include determining a terminal identifier, such as a telephone number, associated with a viewer. For example, a database may be used to map one or more of a CPE ID and a viewer ID to a viewer phone number. The VAS may be configured to search the database using the CPE ID and/or viewer ID received in the message transmitted by the CPE. The VAS response to the message received from the CPE may include determining a node that the CPE belongs to. Using the determined node and the PID included in the message received from the CPE, the VAS may be configured to determine a conference call participant code and/or a conference code, such as a dial-in number.

In some embodiments, the VAS may be configured to transmit one or more of the terminal identifier, the conference code and the conference call participant code to a selected communications/voice application server (CAS). The selected CAS may be chosen based on a numbering plan area (NPA) or a numbering plan area central office exchange code (NPA-NXX) associated with the terminal identifier. The selected CAS may be configured to receive one or more of the terminal identifier, the conference code and the conference call participant code from the VAS. The CAS may be configured to use the terminal identifier to determine a serving switch. The CAS may be configured to transmit a set up message to the serving switch. The set up message may direct the serving switch to initiate communications with a terminal associated with the terminal identifier and may provide a conference bridge number and/or access code.

Other details and features will also be described in the sections that follow.

BRIEF DESCRIPTION OF THE DRAWINGS

The present invention is pointed out with particularity in the appended claims. However, other features of the present invention will become more apparent upon a review of this disclosure in its entirety, including the drawing figures provided herewith, the contents of which are fully incorporated herein by way of reference.

Some features herein are illustrated by way of example, and not by way of limitation, in the figures of the accompanying drawings and in which like reference numerals refer to similar elements.

DETAILED DESCRIPTION

It is noted that various connections are set forth between elements in the following description. It is noted that these connections in general, unless specified otherwise, may be direct or indirect and that this specification is not intended to be limiting in this respect.

Figure 1:
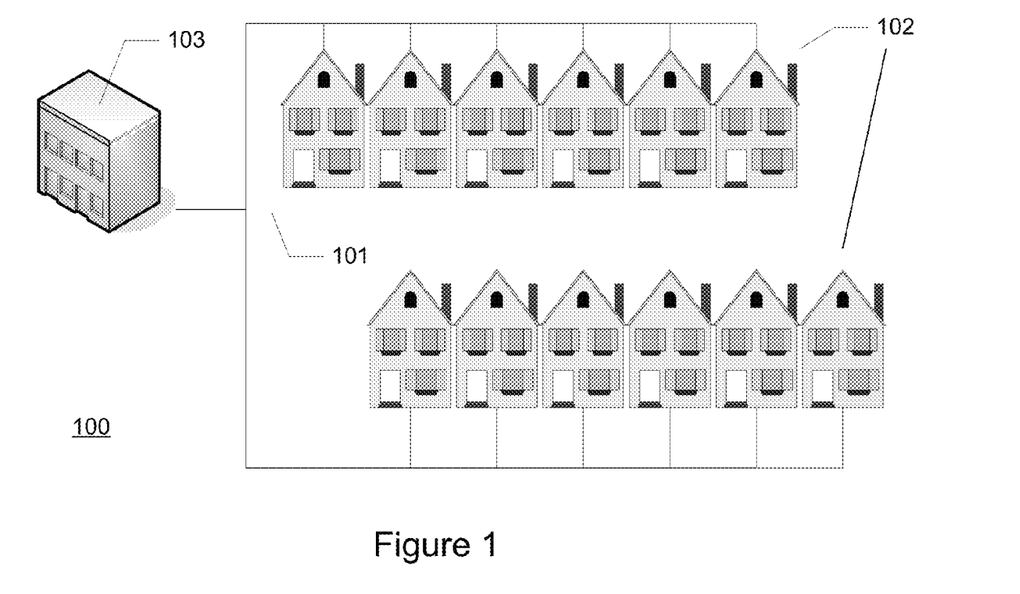
FIG. 1 illustrates an example information distribution system, such as a cable television network.

FIG. 1 illustrates an example information distribution network 100 on which many of the various features described herein may be implemented. Network 100 may be any type of information distribution network, such as satellite, optical fiber, telephone, cellular, wireless, etc. The network 100 may also be a hybrid fiber/coax distribution network found in many cable television networks. Networks 100 may use a series of interconnected lines 101 to connect multiple user locations such as homes 102 to a provider's central office, distribution facility, or headend 103. The facility 103 may transmit downstream information signals onto the lines 101, and each home 102 may have a tuner used to receive and process those signals.

The lines 101 may be a series of interconnected coaxial cables, fiber optic cables, wireless paths, etc. There may be one line originating from the facility 103, and it may be split a number of times to distribute the signal to various homes 102 in the vicinity (which may be many miles) of the facility 103. The lines 101 may include components not illustrated, such as splitters, filters, amplifiers, etc. to help convey the signal clearly. Portions of the lines 101 may also be implemented with fiber-optic cable, resulting in a hybrid fiber/cable network of lines 101. By running fiber optic cable along those portions, signal degradation in those portions may be significantly minimized, allowing a single facility 103 to reach even farther with its network of lines 101 than before.

Figure 2:
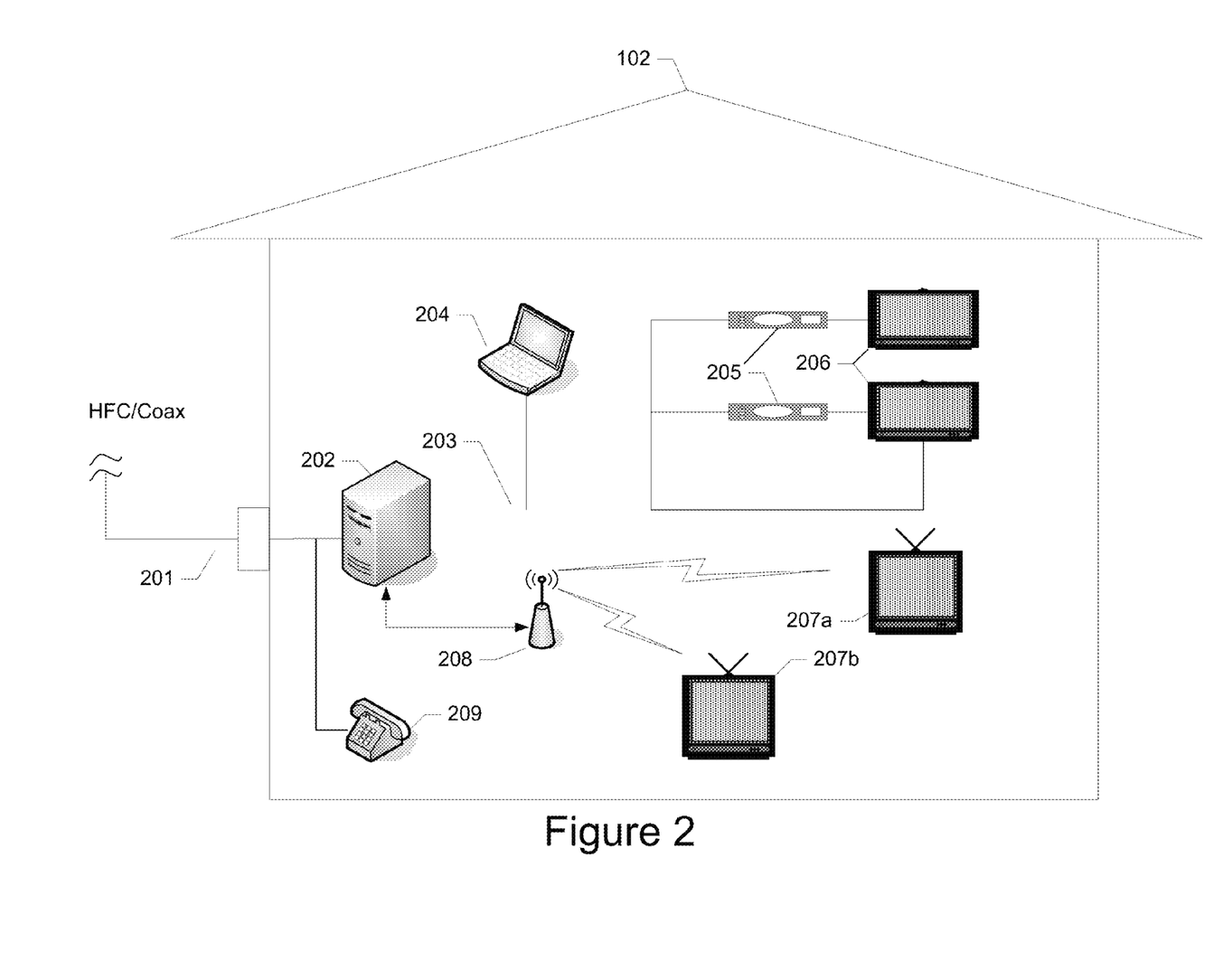
FIG. 2 illustrates an example architecture, with a closer level of detail on one of the premises illustrated in the FIG. 1 network.

FIG. 2 illustrates a closer view of one of the homes 102 from FIG. 1. As illustrated, the home may be connected to the network 100 by, for example, an optical fiber or coaxial cable feed 201. The feed may be connected to a gateway device 202, which may serve as an interface between the devices within the homes 102, and the external devices out on the network 100. The gateway itself may include tuners, modulators, demodulators, etc. to communicate out on the network, and may also include interface components to communicate with the devices in the home.

As for the network in the home, the specific types of components may vary, depending on the type of communication network used in the home. One example may be an Internet Protocol network 203 carried over the home's internal coaxial wiring under the MoCA (Multimedia Over Coax Alliance) standard. To this end, the gateway 202 may be an IP transport gateway, using IP communications to communicate with the devices in the home, and with devices outside the home (e.g., via a DOCSIS CMTS). Other networks, such as wireless networks, may alternatively be used.

Various devices may communicate on this network in the home. For example, one or more personal computers 204 may use the gateway 202 to communicate with other devices on the Internet. Television set-top boxes (STBs) 205 may receive IP distribution of video content received at the gateway 202, and convert that video content into a format suitable for display on corresponding televisions 206. For example, the STBs 205 may receive an MPEG2 stream of video, and may process that stream to generate an HDMI (High Definition Multimedia Interface) output signal to each STB's corresponding television 206. A telephone 209 may communicate over the coaxial line tied to the home.

Some televisions in the home, however, might not have their own STB. Or they might not have the circuitry needed to decode the MPEG2 stream of video received at the gateway 202. For example, televisions 207a and 207b might be old-fashioned analog televisions, having tuners configured to tune to the analog broadcast channels defined by the NTSC (National Television System Committee). Or they may be digital televisions not equipped to receive and decode the latest form of digital compression or modulation used on the network 100. To support such legacy devices, the gateway 202 may include a local wireless transmitter 208.

The local wireless transmitter 208 may be configured to broadcast a low-power radio frequency channel carrying video signals of a selected program for local reception within the home. For example, if the television 207a is an analog television, the gateway 202 may use the transmitter 208 to broadcast a selected program as an NTSC video signal on an NTSC Channel (e.g., channel 2). That channel and signal can be tuned by the television 207a, and displayed for the user's consumption. In this manner, legacy devices may continue to be used even if broadcast transmission techniques advance. The transmitter 208 may be of any desired wireless format, such as IEEE 802.11, ZIGBEE, BLUETOOTH, etc. An 802.11 transmitter 208 may be especially useful, since the 2.4 GHz range of that standard happens to overlap the 300 MHz-3 GHz frequency range of the NTSC UHF channels.

Figure 3:
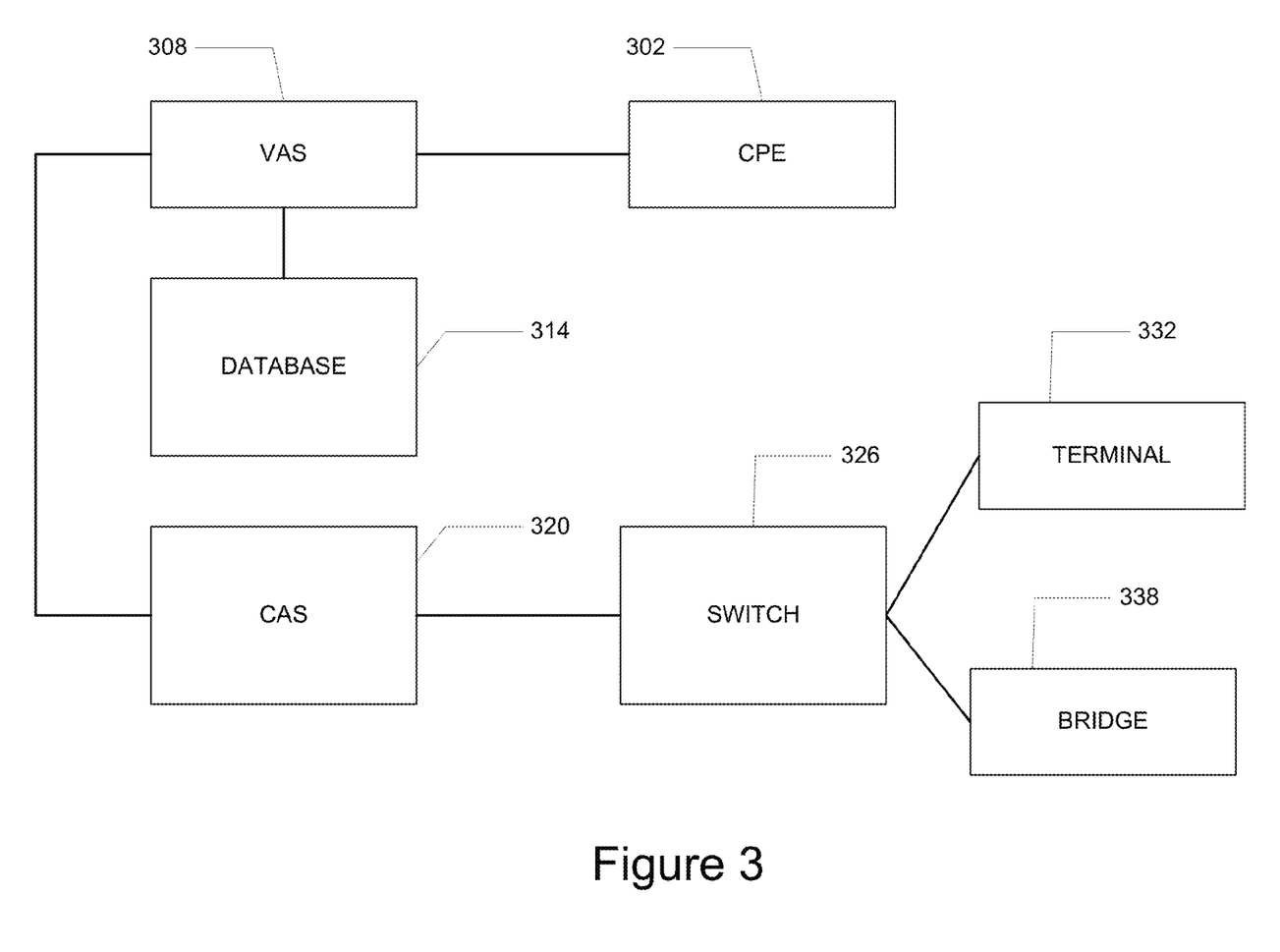
FIG. 3 illustrates an example architecture that may be used in accordance with one or more aspects of this disclosure.

FIG. 3 illustrates an architecture that may be used in conjunction with the systems and architectures shown in FIGS. 1 and 2. As shown in FIG. 3, a customer premise equipment device (CPE) 302 (e.g., a STB 205 or television 206 of FIG. 2, or any other user device) may be coupled to a video application server (VAS) 308. Coupled, as used herein, means connected in any way to receive a signal (e.g., wireless). CPE 302 may be configured with and running a two-way extensible markup language (XML) application in some embodiments. CPE 302 may also communicate with VAS 308 using one or more protocols, such as Data Over Cable Service Interface Specification (DOCSIS), Multimedia over Coax Alliance (MoCA), or wireless protocols. VAS 308 may be located at or included as part of a provider's distribution system (e.g., facility 103 of FIG. 1) in some embodiments.

In some embodiments, VAS 308 (or more generally, a server or other computer platform) may be configured to transmit programming content to CPE 302. While discussion provided herein is with respect to a VAS (e.g., VAS 308), any type of server or provider's system may be used in some embodiments. The programming content may include audio-visual content associated with television shows, movies, and the like. The programming content may also include information and data for generating an electronic programming guide (EPG) or an interactive programming guide (IPG).

Figure 4A:
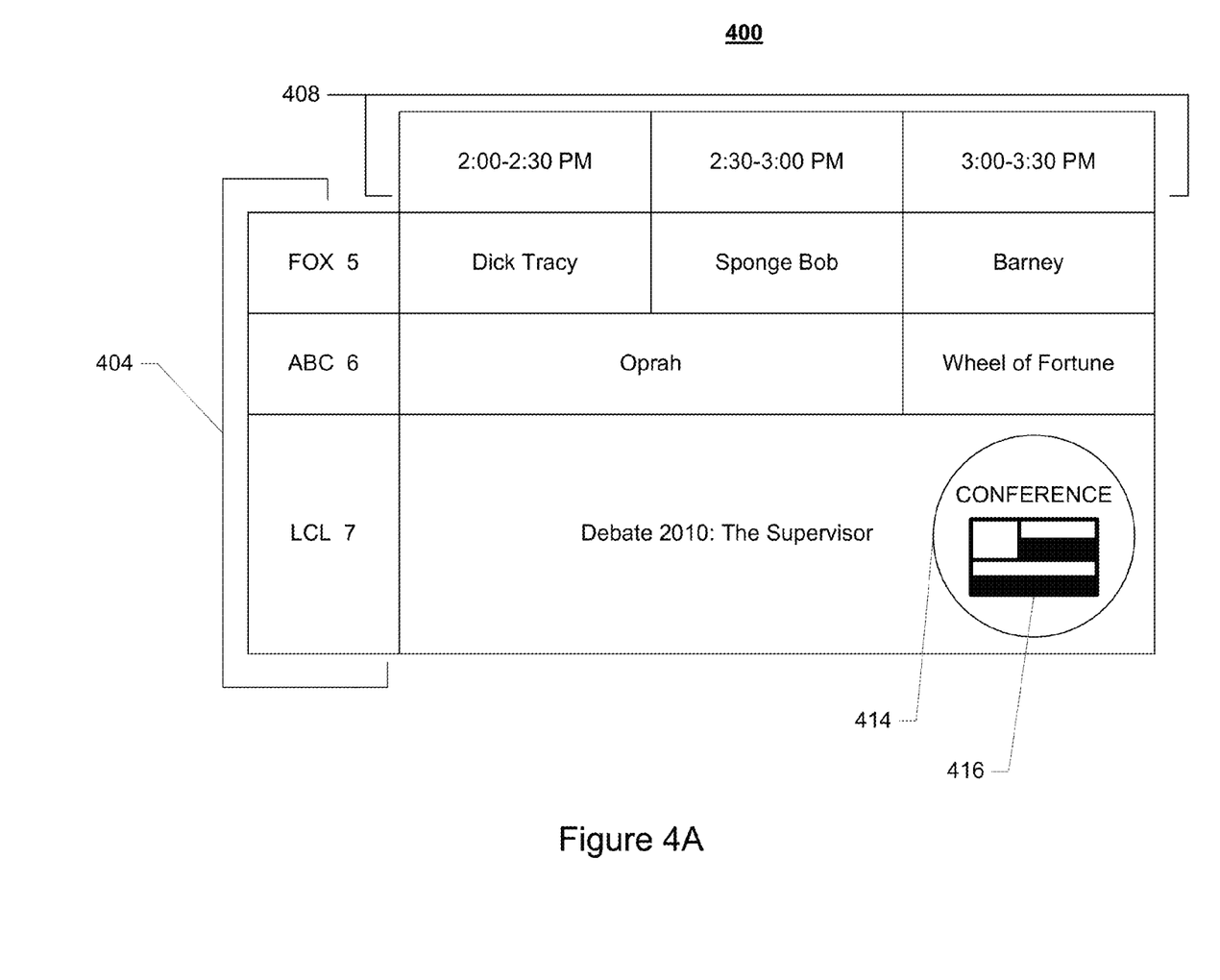
FIGS. 4A and 4B illustrate electronic programming guide (EPG) or interactive programming guide (IPG) interfaces that may be used in accordance with one or more aspects of this disclosure.

Referring to FIG. 4A, an illustrative EPG/IPG 400 is shown. EPG/IPG 400 may include a number of channels 404, such as channels 5-7. EPG/IPG 400 may also include an indication of a network provider or content source associated with channels 404, such as FOX, ABC, and LCL. EPG/IPG 400 may include a time axis 408. For example, as shown in FIG. 4A, time axis 408 covers the time frame from 2:00-3:30PM. The intersection of a channel 404 with a time frame/block included in time axis 408 may allow a user to correlate a channel number with a given time to determine what programming content is available for viewing at the given time. For example, EPG/IPG 400 may include programming content Dick Tracy, Sponge Bob, Barney, Oprah, Wheel of Fortune, and Debate 2010: The Supervisor.

As shown in FIG. 4A, a conferencing icon may be associated with one or more programs included in EPG/IPG 400. For example, associated with program Debate 2010: The Supervisor is a conferencing icon 414. The inclusion of conferencing icon 414 with program Debate 2010: The Supervisor may serve to indicate to a viewer/user of EPG/IPG 400 that conferencing options are available with respect to the program. In some embodiments a symbol, such as flag 416, may be included with conferencing icon 414. Symbol flag 416 may be useful for helping a viewer to differentiate or distinguish one program's conferencing availability from another. For example, a flag may typically be associated with government and may be suitable for a program geared towards a debate for a seat in an elected office. Conversely, a symbol of human lips (not shown in FIG. 4A) may be appropriate for a talk show, such as the Oprah program included in EPG/IPG 400. The choice of what symbol or icons to use may be made by a content source provider, a network or system operator, or the viewer in some embodiments. Alternatives to using a symbol may be used in some embodiments. For example, in some embodiments a menu or table may be used to provide information on what programming content is supported by conferencing.

Figure 4B:
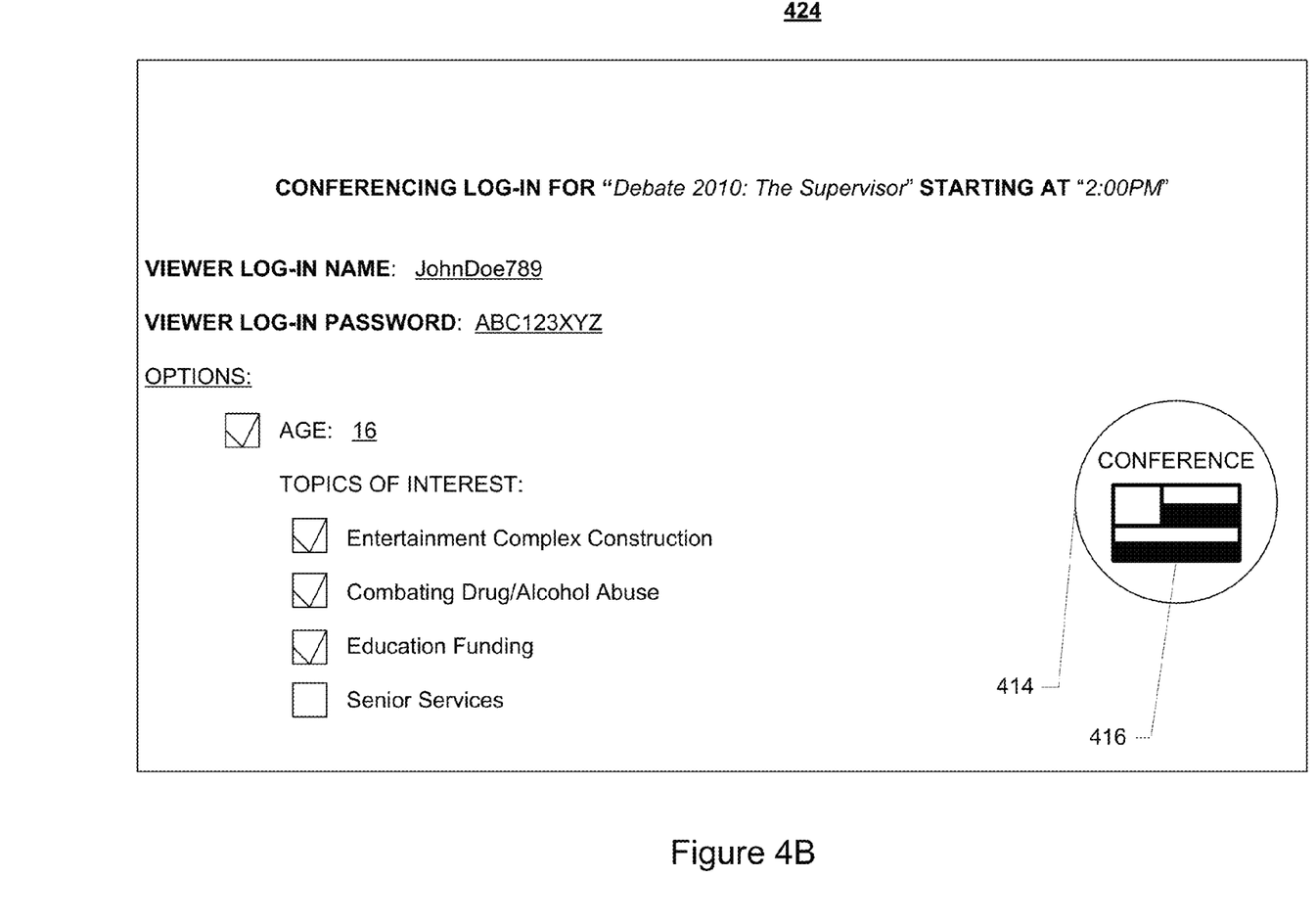

Responsive to a user selection of conferencing icon 414, for example, a log-in menu or display screen 424 may be generated as shown in FIG. 4B. As shown in FIG. 4B, information such as a name of the program ("Debate 2010: The Supervisor") and a starting time ("2:00PM") of the program may be included in log-in menu 424, as may a copy of conferencing icon 414 and symbol 416. Such information may be useful for reminding a user of what program the user selected for purposes of conferencing options. Log-in menu 424 may also include a field for entering a log-in name and password.

For example, as shown in FIG. 4B, the viewer may have a log-in name of "JohnDoe789" and a password of "ABC123XYZ." The viewer may input the log-in name and password via a remote control device coupled to the CPE 302 of FIG. 3, directly on the CPE 302 (e.g., via one or more buttons or keys located on CPE 302), via a computer (e.g., personal computer 204 of FIG. 2) coupled to the CPE 302, or the like.

The use of a log-in name and password described above is illustrative. In some embodiments, alternative techniques for determining the identity of a viewer may be used. For example, a viewer may input a personal identification number (PIN), engage in a fingerprint or retinal scan, etc. In some embodiments, a course characterization may be made based on an ID associated with the CPE 302. For example, if CPE 302 is located (or registered as existing) in a child's bedroom, based on a transmission of an ID associated with CPE 302 to VAS 308, VAS 308 may presume that the viewer is the child. Knowledge of the age of the viewer/user may be used to tailor or restrict conferencing content as described further below.

Returning to the above example, responsive to a log-in name and password entry, CPE 302 may be configured to transmit an initial message to a server, such as the VAS 308. The initial message may include the entered log-in name and password. VAS 308 may confirm or authenticate the entered log-in name and password in some embodiments. For example, if a viewer is to be charged a fee for engaging in a conference, authentication of the entered log-in name and password may be used to bill an account associated with the viewer. The initial message transmitted from CPE 302 to VAS 308 may include a program identification (PID) associated with the selected program (e.g., "Debate 2010: The Supervisor" in FIGS. 4A and 4B). The PID may include one or more of a program name, a channel identification, and a time that the program is being displayed or transmitted.

Responsive to receiving the PID (and authenticating the log-in name and password in some embodiments), VAS 308 may be configured to look up conferencing options information associated with the selected program. For example, VAS 308 (or a database 314 associated with VAS 308) may store conferencing options information associated with each program in a table and may use the PID received from CPE 302 as an index or identifier into the table. VAS 308 may be configured to transmit the conferencing options information associated with the selected program to CPE 302. For example, as shown in FIG. 4B, the conferencing options information may include the age of the viewer. In some embodiments, instead of transmitting the age of the viewer to CPE 302, the viewer may simply enter his/her age into CPE 302.

Topics of interest may also be included in the conferencing options information transmitted by VAS 308 to CPE 302. For example, in relation to the program "Debate 2010: The Supervisor," dealing with a debate for the post of town supervisor, topics for discussion during a conference may include construction of an entertainment complex in the town, efforts to combat drug and alcohol abuse, funding for educational programs, and the provision of services for seniors or the elderly in the town community.

In some embodiments, the viewer may have the ability to select one or more of the age and topics of interest in order to filter or tailor conferencing content. For example, as shown via the checkboxes in FIG. 4B, the viewer may be interested in hearing from the candidates for supervisor on topics related to the construction of the entertainment complex, efforts to combat drug and alcohol abuse, and funding for educational programs. That same viewer might not be interested in hearing about services for seniors, as indicated by the lack of a check in the associated checkbox. The viewer may want to be placed in a conferencing group with his/her peers that are close in age, and so the viewer may place a check in the checkbox next to his/her age (16). In some embodiments, the viewer might not have an option to check the checkbox next to his/her age; rather, the checkbox may be checked off automatically. For example, viewer identification techniques may be used in connection with parental control settings to ensure that a younger viewer is precluded from accessing restricted conferencing content.

CPE 302 may be configured to transmit the options selected by the viewer to VAS 308 for purposes of tailoring a conference for the viewer. For example, based on the selections shown in FIG. 4B, VAS 308 may be configured to place the viewer in a conference where the participants are ages 14-18. That same viewer may speak with or listen to the candidates for supervisor regarding the construction of the entertainment complex, efforts to combat drug and alcohol abuse, and funding for educational programs.

In relation to the topic that the viewer did not indicate an interest in, when the candidates intend to speak or debate one another regarding the provision of senior services in the town, the viewer may be redirected to different/alternative conferencing content in some embodiments. For example, the viewer may be redirected to support staff for each of the candidates to discuss one or more of the topics the viewer shows interest in greater detail while the candidates discuss and debate senior services. Alternatively, the conference may be paused or terminated for the viewer when the topics that are not of interest to the viewer are being discussed. Accordingly, the viewer may be granted access to portions of a conference corresponding to the viewer selections of conferencing options. Such pausing or termination may be useful in embodiments where the viewer is charged based on his/her level of participation in the conference. For example, the viewer might only be charged based on the selected topics of interest and may only gain access to the conference when the candidates are speaking about those select topics.

As described above, in some embodiments VAS 308 may be configured to wait for the receipt of the program identifier (PID) prior to transmitting conferencing options information to CPE 302. Such embodiments may be useful for purposes of conserving (at least a portion of the) downstream transmission bandwidth because only those conferencing options that are relevant to the selected program are transmitted to CPE 302. In alternative embodiments, VAS 308 may transmit the conferencing options information associated with all programs that support conferencing to CPE 302. In those alternative embodiments, CPE 302 may filter the information based on the particular conferencing icon selected for purposes of generating all of, or portions of, log-in menu 424. Such alternative embodiments may be useful in conserving processing resources at VAS 308.

Based on the receipt of the viewer log-in information VAS 308 may be configured to lookup in database 314 a terminal identifier associated with the viewer. The terminal identifier may be associated with a terminal associated with the viewer. In some embodiments, the terminal associated with the viewer may be a telephone, and the terminal identifier may include a telephone number. For example, database 314 may store or maintain a table associating viewer log-in IDs with telephone numbers. After the lookup is complete, VAS 308 may be configured to transmit the viewer's telephone number retrieved/received from database 314 to communication/voice application server (CAS) 320. While a single CAS 320 is shown in FIG. 3 for purposes of illustrative simplicity, in some embodiments, multiple CASs 320 may be in use. In terms of selecting a CAS 320, a CAS 320 may be chosen based on a numbering plan area (NPA) or numbering plan area central office exchange code (NPA-NXX) associated with the viewer telephone number. In some embodiments, an association table between NPA/NPA-NXX and CASs may be maintained in one or more of VAS 308 and database 314 in order to facilitate choosing an appropriate CAS. In some embodiments, the terminal may be any other CPE device.

Based on receipt of a CPE ID from CPE 302, VAS 308 may be configured to determine a node that is associated with CPE 302. For example, service providers may use nodes as a fundamental network aggregation level/indication of location and use the nodal framework as a basis for maintenance and troubleshooting. In some embodiments, a home-to-node mapping may be communicated to a central database to facilitate a self discovery process. For example, with a DOCSIS capable upstream set top box (STB), the STB may auto discover the node that it is homed to.

A determined node may be used as a proxy for the viewer's location. Continuing the above example related to the program "Debate 2010: The Supervisor," knowing the viewer's nodal location may be used for organizing conference participants into specific conference groups. Thus, organizers or a moderator of the supervisor debate may take a representative number of questions from each conference group, which in turn would have the effect of taking questions from a distribution of the town's communities. In this way, each of the town's various communities may be given equal or a proportionate amount of access to the candidates. As described above, VAS 308 may also use viewer selected conferencing options received from CPE 302 for purposes of organizing the conference groups as well.

Additional techniques may be used for controlling the conference groups. For example, the size of a conference group may be controlled by imposing a minimum or a maximum in terms of the number of participants within the conference group. If the maximum is about to be exceeded in a particular conference group as a result of a high-degree of interest, the conference groups may be reorganized or a new conference group may be spawned. Similarly, if a particular conference group is decreasing in size due to a lack of interest, the conference groups may be reorganized or the particular conference group may be terminated or disbanded.

Based on receipt of the program identifier (PID), and based on the node that CPE 302 is determined to be associated with, VAS 308 may be configured to determine a participant code. If multiple conference code identifiers (e.g., dial-in numbers) are used for purposes of conferencing, an appropriate conference code identifier may be looked up based on the PID and the node determination. VAS 308 may be configured to transmit the (appropriate) conference code identifier and/or participant code to CAS 320, in addition to the terminal identifier described above. The communication interface between VAS 308 and CAS 320 may be implemented using the Session Initiation Protocol (SIP) in some embodiments. Other protocols or standards may be used in some embodiments.

CAS 320 may be configured to determine a serving (telephone) switch 326 based on the receipt of the terminal identifier. In some embodiments, switch 326 may be a standard circuit switch, such as a 5ESS as produced by Alcatel-Lucent or a Nortel Digital Multiplex System (DMS). Other technologies, such as a VoIP CMS or an IMS core, may be used for purposes of switch 326. Communications between CAS 320 and switch 326 may take place using a Transaction Capabilities Application Part (TCAP) SS7 message when switch 326 is a class V switch. In embodiments where switch 326 is implemented using VoIP or IMS, the messaging protocol used may be SIP.

Switch 326 may be configured to receive the terminal identifier from CAS 320 and may initiate communication with a terminal 332 associated with the terminal identifier. Terminal 332 may comprise one or more devices, such as a cellular phone, a smartphone, a personal digital assistant (PDA), a laptop computer, a personal computer, etc.

In embodiments where terminal 332 includes a phone, switch 326 may be configured to receive a telephone number associated with the phone from CAS 320 and may ring the phone in response thereto. In response to the ring, the viewer may pick-up or answer the phone. While a single terminal 332 is shown in FIG. 3, in some embodiments multiple terminals may be used. For example, each conference participant may have one or more terminals 332. Such a terminal may be incorporated into a user's display device, or may be a stand alone device.

Switch 326 may be configured to receive a conference code identifier and/or participant code from CAS 320 and forward the same to terminal 332. In this manner, the viewer may hear or otherwise receive (e.g., via a text message or email) the conference code identifier and/or participant code. In some embodiments, VAS 308 may be configured to transmit the conference code identifier and participant code to CPE 302, and the conference code identifier and participant code may be displayed on a display screen associated with or coupled to CPE 302.

In some embodiments, one or more of the conference code identifier and participant code might not be transmitted to terminal 332/CPE 302. In those embodiments, the conference code identifier and/or participant code may be hidden from the user or viewer. The conference code identifier and/or participant code may simply be passed/transmitted to switch 326, and switch 326 may use the received conference code identifier and participant code to set up a conference between terminal 332 and bridge 338.

Switch 326 may be configured to pass the conference code identifier and/or participant code information to a bridge 338 for purposes of allocating bridge resources to support the conference. Thereafter, the viewer may connect to the conference using the conference code identifier and/or participant code.

In some embodiments, conferencing may include audiovisual programming content to supplement discussion between various parties. Continuing the above example, when the viewer identified by: (1) the viewer log-in name "JohnDoe789" (as shown in FIG. 4B), and/or (2) a corresponding CPE ID, speaks during the discussion with the candidates for supervisor, a profile associated with that viewer may be made available (e.g., distributed) to all the other conference participants. The profile made available may include a profile or information maintained by a social networking website. In this manner, conference participants (including the candidates) may obtain background information or context as to who it is that is speaking The profile that is made available may also include the viewer's age and the topics that the viewer selected as being of interest as shown in FIG. 4B. For example, VAS 308 (and/or database 314) may store or otherwise maintain the topical selections and may transmit those selections to one or more terminals 332 (or CPEs 302) when the viewer speaks. In this manner, the candidates may be able to tailor their remarks to those matters that are of interest to the particular viewer and may be able to thematically tie otherwise disparate points of conversation in an effort to persuade the viewer. Also, conference participants may gain perspective on what issues are relevant to the viewer, a fellow town resident, and may modify or alter the relative importance or emphasis placed on a topic in response.

In some embodiments, VAS 308 may generate statistics based on the profiles associated with the conference participants. Such statistics may be used by a candidate to emphasize those points that are likely to resonate with the conference participants and may be used by the candidate to minimize or downplay those points that might be less popular with the electorate. For example, as a part of the conference, a candidate may initiate a distribution of a video to terminals 332 (or CPEs 302), the distributed video showing efforts the candidate has undertaken to speed up the construction of the entertainment complex in the town if the statistics indicate that the majority of the conference participants are in favor of seeing the entertainment complex completed. On the other hand, if the statistics indicate that the majority of the conference participants don't want to see the entertainment complex completed, the same (two-faced) candidate may initiate a distribution of an alternative video to terminals 332 (or CPEs 302), the alternative video including a speech the candidate made a year ago regarding the need to preserve the small-town character of the town by foregoing construction of modern entertainment facilities.

The candidates or a moderator of the conference may initiate a poll of the conference participants. For example, after the candidates have debated and discussed the construction of the entertainment complex, a poll may be taken of the conference participants to determine which candidate is favored by the participants with respect to that topic/issue. The conference participants may select a favored candidate on terminals 332, and the selections may be conveyed to a server or other computer platform (e.g., VAS 308) for tallying. The tallied poll results may be published or made available for display.

In short, various forms of audiovisual content may be integrated or associated with discussion to support a conference. The distribution of the audiovisual content may occur automatically or in response to a participant request to have the audiovisual content distributed. Moreover, while described above as the candidate(s) initiating the distribution of audiovisual content (e.g., a video), in some embodiments the other conference participants may initiate the distribution of audiovisual content. For example, if during the conference a candidate is not being completely candid with respect to his/her position on a given issue, the viewer may initiate a distribution of information such as a letter or other document to terminals 332 (or CPEs 302) used by the other conference participants, the letter including statements made by the candidate that run counter to the position that the candidate is taking during the conference.

In terms of controlling the dialogue that takes place during the conference, techniques may be used in addition to, or as an alternative to, the conference groups described herein. Continuing the above example, in order to account for a participant that is taking up more than his/her fair share of the candidates' time, a moderator may have the ability to remove the abusive participant from the conference or participants in the conference may choose to vote that abusive participant out of the conference when their cast votes exceed a threshold value. In some embodiments, a delay may be imposed in order to confirm that the dialogue is suitable for receipt by the conference participants. For example, one or more buffers may be included in one or more of switch 326, terminal 332, and bridge 338. Filtering techniques may be used to remove or alter the dialogue in connection with the buffered and delayed dialogue.

The functions described above were discussed as being allocated to, or existing within, one of CPE 302, VAS 308, database 314, CAS 320, switch 326, terminal 332, and bridge 338. In some embodiments the functionality discussed with respect to one device (e.g., VAS 308) may be reallocated to, or exist within, another device (e.g., CAS 320). Moreover, while the devices in FIG. 3 are shown as being separate, in some embodiments two or more of the devices may be combined into a single form-factor or reside within a common casing or housing.

Figure 5:
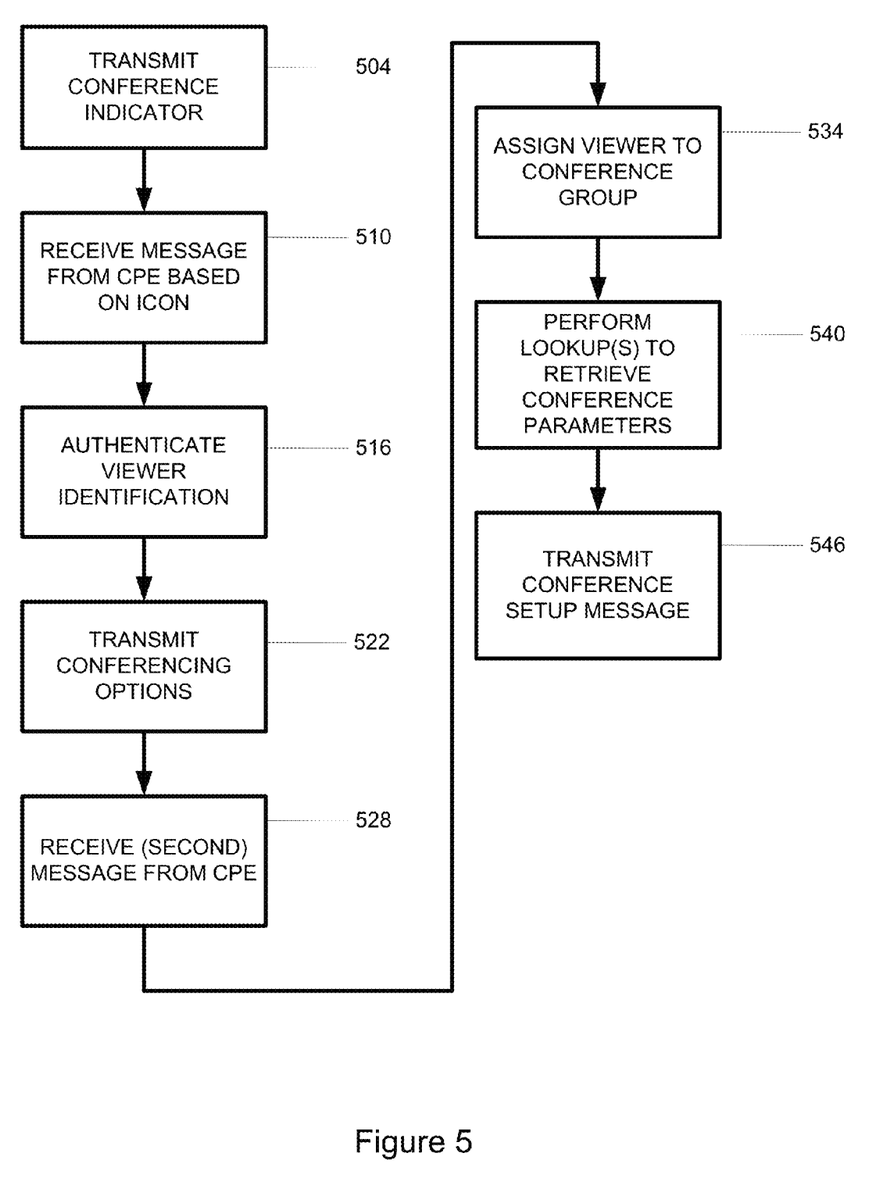
FIG. 5 illustrates a method that may be used in accordance with one or more aspects of this disclosure.

FIG. 5 illustrates a method that may be used in connection with one or more aspects of this disclosure. In step 504, an indicator (e.g., an icon, menu representation, etc.) may be transmitted for display. The transmitted indicator may indicate, for example, that conferencing support is available with respect to content listed in an electronic programming guide (EPG) or an interactive programming guide (IPG). Alternatively, the transmitted indicator may be configured to be displayed directly with the programming content (e.g., a television show, a movie, a video, etc.). The transmitted indicator may be generated by a content source or a network operator in some embodiments.

In step 510, a message may be received from a customer premise equipment device (CPE). The message received in step 510 may be in response to a viewer selecting the indicator transmitted in step 504 via the CPE, or upon registering the CPE. The message received in step 510 may include one or more of a CPE ID, a viewer ID (e.g., log-in name and password), and a program identifier (PID).

In step 516, in response to receiving an ID in step 510, the ID (e.g., a viewer or CPE ID) may be authenticated or confirmed. In some embodiments, the authentication performed in step 516 may include billing an account associated with the viewer or the CPE. For example, such billing may be used where the conference is charged based on a flat-rate, irrespective of any conferencing options selected by the viewer.

In step 522, conferencing options associated with the PID received in step 510 may be transmitted to the CPE (optionally in response to authenticating the viewer ID in step 516).

In step 528, a (second) message may be received from the CPE. The message may include conferencing options selected by the viewer. In some embodiments, an account associated with the viewer or CPE may be billed based on the conferencing options selected by the viewer. For example, in embodiments where the viewer is charged based on the conferencing options selected, an account associated with the viewer may be debited based on the options received via the (second) message. In other embodiments the conference originator or a third party may be billed for the conference.

In step 534, the viewer may be assigned to a conference group based on one or more of a nodal location of the CPE (based on the CPE ID received in step 510) and the conferencing options selected by the viewer (in step 528).

In step 540, a lookup may be performed based on the viewer ID to fetch or retrieve conference parameters, including a terminal identifier associated with the viewer, such as a phone number. A second lookup may be performed to determine additional conference parameters, such as a conference code identifier and/or participant code, based on the PID received in step 510 and the nodal location of the CPE. In some embodiments, the conference parameters may include whether the conference holder allows the user to communicate via audio only, via audio and video (video conference), and/or via displaying or collaborative sharing of user documents.

In step 546, a conference setup message (which may include one or more of the conference parameters) may be transmitted to a switch, which in turn may forward portions of the conference setup message to a viewer terminal (e.g., phone, display device, etc.) or conference bridge. As part of step 546, (portions of) the conference setup message may be transmitted to the CPE.

The method described above with respect to FIG. 5 is illustrative. In some embodiments, some of the steps may be optional, additional steps not shown may be included, and the steps may be rearranged or reordered. For example, in some embodiments the conferencing options associated with the conference (step 522) may be transmitted with the transmission of the indicator (step 504). In this manner, the viewer might not have to submit a viewer ID (e.g., log-in name and password) prior to knowing what conferencing options are available.

While the above description was sometimes presented in the context of a debate for elected office, aspects of this disclosure may readily be applied to other contexts as well. For example, political parties could setup town hall meetings and may pay for a conference bridge to be spawned from one or more local, regional, or national content provider stations or channels. In the context of a sitcom, aspects of this disclosure may be used to engage viewers with one or more actors or actresses from the sitcom in a conference, with the viewers optionally being charged a fee to engage in such a conference. In the context of sporting events, viewers could engage in "trash talk" and camaraderie typically associated with a sports bar environment from the comfort of their own home. Similarly, conference bridges can be established for "stay at home" parents to discuss soap operas, talk shows, and the like. Neighbors that interact with one another offline may want to extend their relationships to an online environment, and aspects of this disclosure provide those neighbors the opportunity to do just that. Of course, the contexts described herein are merely illustrative. Additional contexts are well within the scope and spirit of this disclosure.

Although not required, various aspects described herein may be embodied as a method, a data processing system, or as a computer-readable medium storing executable instructions. Accordingly, those aspects may take the form of an entirely hardware embodiment, an entirely software embodiment, an entirely firmware embodiment, or an embodiment combining software, firmware and hardware aspects. The functionality may be resident in a single computing device, or may be distributed across multiple computing devices/platforms, the multiple computing devices/platforms optionally being connected to one another via one or more networks. In addition, various signals representing data or events as described herein may be transferred between a source and a destination in the form of electromagnetic waves traveling through signal-conducting media such as metal wires, optical fibers, and/or wireless transmission media (e.g., air and/or space). One or more transitory and/or non-transitory computer readable media may be used in some embodiments. The one or more media may store instructions that, when executed by one or more computers or apparatuses, cause the one or more computers or apparatuses to perform the various methodological acts and processes described herein.

As described herein, the various methods and acts may be operative across one or more computing servers and one or more networks. The functionality may be distributed in any manner, or may be located in a single computing device (e.g., a server located at a facility, a client computer, etc.). As discussed herein, access to audiovisual programming content and programming related information may be obtained across various televisions, computers and the like, and conferencing options may support the establishment of a conference based on common interests and/or geographical location.

As described herein, the methodological acts and processes may be tied to particular machines or apparatuses. For example, as described herein, a customer premise equipment device (CPE), such as a set-top box (STB), a television, a telephone, a hand-held smart device, etc., may be used in various embodiments of this disclosure to associate content with a conference and for participating in the conference. More generally, one or more computers may include one or more processors and memory storing instructions, that when executed, perform the methodological acts and processes described herein. Furthermore, the methodological acts and processes described herein may perform a variety of functions including transforming an article (e.g., an icon or other representation of a conferencing option associated with content) into a different state or thing (e.g., the establishment of a conference via a television and/or telephone network(s) based on a terminal identifier associated with a viewer and/or a geographical location of the viewer).

The various embodiments and examples described above are, as stated, merely examples. Many variations may be implemented to suit a particular implementation, and the various features may be combined, divided, rearranged, omitted and/or augmented as desired. The scope of this patent should not be limited by any of the specific examples described herein.

What is claimed is:

1. A method comprising:
   transmitting, from a computing device to a customer premise equipment (CPE) device, a conferencing option that indicates that a conference is available for a particular piece of content;
   receiving, by the computing device, a conference program identification (PID) identifying the particular piece of content and receiving a terminal identifier;
   determining a particular conference code identifier, from among a plurality of conference code identifiers identifying different conferences, using the PID;
   determining a switch based on the terminal identifier; and
   transmitting a conference setup message to the switch, the conference setup message comprising the particular conference code identifier.

2. The method of claim 1, wherein the conference setup message directs the switch to initiate communication with a terminal corresponding to the terminal identifier.

3. The method of claim 2, wherein the terminal identifier comprises a telephone number.

4. The method of claim 2, wherein the communication comprises a telephone call via a plain old telephone service or a cellular network.

5. The method of claim 1, wherein the conference setup message comprises a conference bridge number.

6. The method of claim 1, wherein the conference setup message comprises an access code to the conference.

7. The method of claim 1, further comprising:
   receiving a user identification (ID) associated with a user of the CPE device; and
   authenticating the user ID.

8. The method of claim 7, further comprising:
   charging an account associated with the user in response to authenticating the user ID.

9. The method of claim 1, further comprising:
receiving a criterion; and
assigning a terminal, corresponding to the terminal identifier, to a conference group based on the criterion.

10. The method of claim 9, wherein the criterion comprises at least one of a user's age and a topic of interest.

11. The method of claim 1, further comprising:
receiving a criterion; and
granting a user access to a segment of the conference based on the criterion.

12. The method of claim 1, wherein the conferencing option is configured to be displayed within at least one of an electronic programming guide (EPG) and an interactive programming guide (IPG).

13. The method of claim 1, wherein the conferencing option includes a symbol representing a genre of the conference.

14. The method of claim 1, further comprising generating statistics based on profiles of participants in the conference.

15. The method of claim 1, further comprising tallying results of a poll of participants in the conference.

16. A method comprising:
receiving, by a computing device from a customer premise equipment (CPE) device, a conference program identification (PID) and a terminal identifier, based on a selection of a conferencing option that indicates conferencing is available for a particular piece of content;
looking up a particular conference code identifier, from among a plurality of conference code identifiers identifying different conferences, using the PID;
determining a switch based on the terminal identifier; and
transmitting a conference setup message to the switch, the conference setup message comprising the particular conference code identifier.

17. The method of claim 16, further comprising broadcasting the particular piece of content to the CPE device and one or more additional CPE devices.

18. The method of claim 16, wherein the conference setup message directs the switch to initiate communication with a terminal corresponding to the terminal identifier.

19. An apparatus comprising:
at least one processor; and
memory storing instructions that, when executed by the at least one processor, cause the apparatus to:
transmit, to a customer premise equipment (CPE) device, a conferencing option that indicates that a conference is available for a particular piece of content;
receive a conference program identification (PID) identifying the particular piece of content, and receive a terminal identifier;
determine a particular conference code identifier, from among a plurality of conference code identifiers identifying different conferences, using the PID;
determine a switch based on the terminal identifier; and
transmit a conference setup message to the switch, the conference setup message comprising the particular conference code identifier.

20. The apparatus of claim 19, wherein the conference setup message directs the switch to initiate communication with a terminal corresponding to the terminal identifier.

* * * * *